E. SCHNEIDER.
DETACHABLE TIRE FOR TRACTION WHEELS.
APPLICATION FILED JULY 21, 1920.

1,373,530.

Patented Apr. 5, 1921.
2 SHEETS—SHEET 1.

Inventor
Eugene Schneider
By Mants, Cameron, Lewis & Kerkam
attorneys

E. SCHNEIDER.
DETACHABLE TIRE FOR TRACTION WHEELS.
APPLICATION FILED JULY 21, 1920.
1,373,530.
Patented Apr. 5, 1921.
2 SHEETS—SHEET 2.
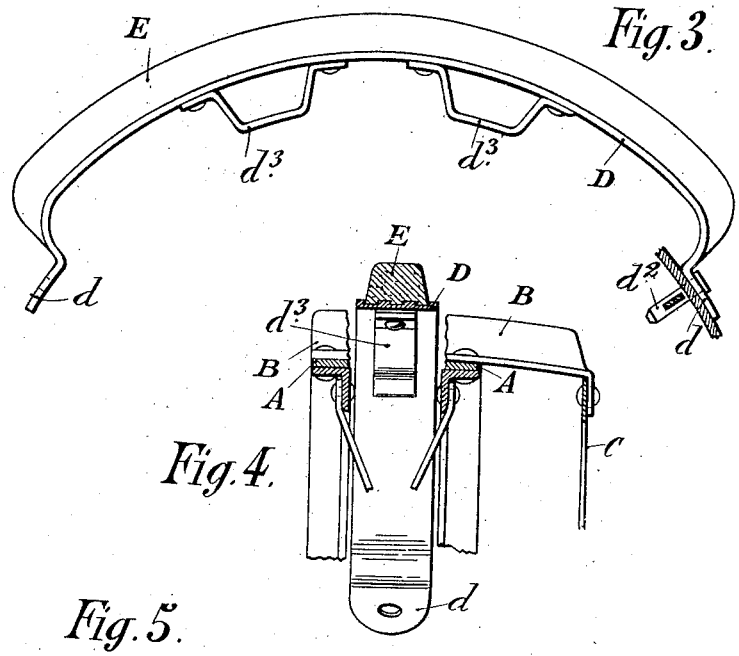
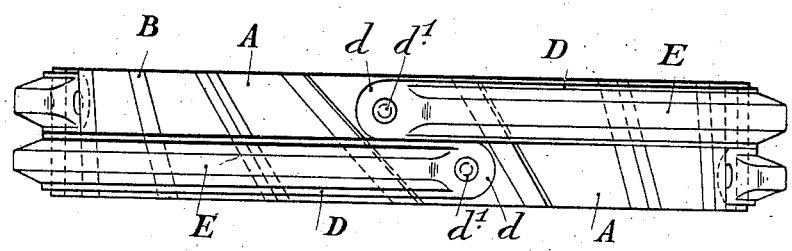
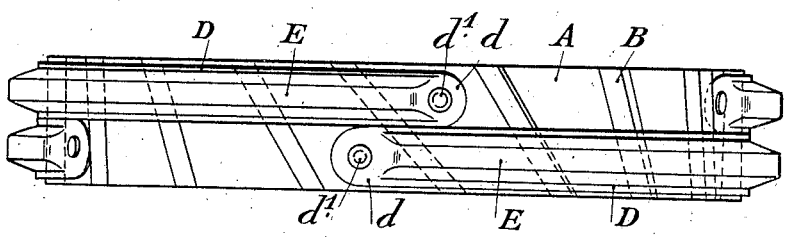

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

DETACHABLE TIRE FOR TRACTOR-WHEELS.

1,373,530.  Specification of Letters Patent.  Patented Apr. 5, 1921.

Application filed July 21, 1920. Serial No. 397,953.

*To all whom it may concern:*

Be it known that I, EUGÈNE SCHNEIDER, a citizen of the Republic of France, resident of Paris, France, have invented new and useful Improvements in Detachable Tires for Tractor-Wheels, which invention is fully set forth in the following specification.

This invention has for its object a detachable tire, more particularly designed to be employed in combination with tractor wheels the tire of which is provided with gripping devices, such as calks, angle-bars or strakes.

The improved detachable tire is particularly characterized by the feature that it is composed of a series of elements or sectors constituting together a common envelop for the gripping devices with which the wheel rim is provided, the enveloping being effected in such a manner that there is at no point any support between the inner surface of the detachable tire and the said gripping devices.

For this purpose the sectors or elements constituting a concentric whole around the wheel rim are bent over at their ends in such a manner that these ends each take a bearing upon the said wheel rim between two consecutive gripping devices, and they may on the other hand be provided between their extreme points of attachment, with projections fixed on their inner surface by means of which they gain intermediate points of support upon the wheel rim.

According to a practical constructional form of this invention, the detachable enveloping elements whose ends fixed to the wheel rim are astride of each other, instead of being concentric to the wheel rim, are wound on the latter in the form of sections of a helix. Owing to the ends being astride of each other, the continuity of the attached tread is assured; on the other hand the winding in the form of sections of a helix has the advantage of improving the gripping action in the case of slipping.

Various constructional forms of this invention are illustrated by way of example in the accompanying drawings in which:—

Fig. 3 is an elevation of a separate element of the improved detachable tire;

Fig. 4 is a partial section on the line 4—4 of Fig. 2; and

Figs. 5 and 6 are plans of two modifications.

Figure 2:
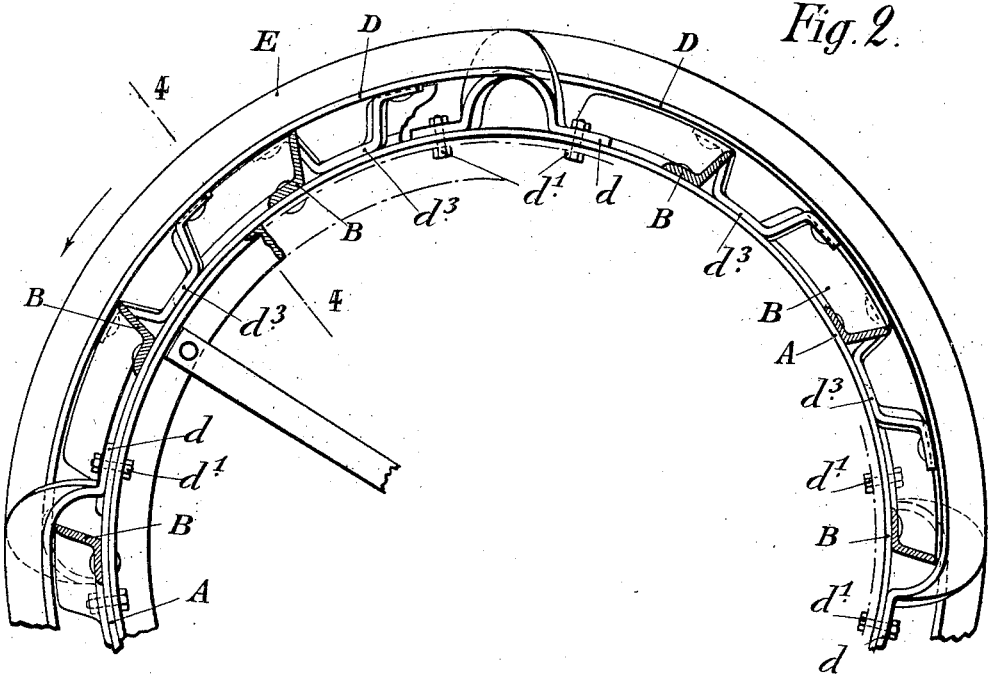
Fig. 2 is a partial vertical section on the line 2—2 of Fig. 1.
Figure 1:
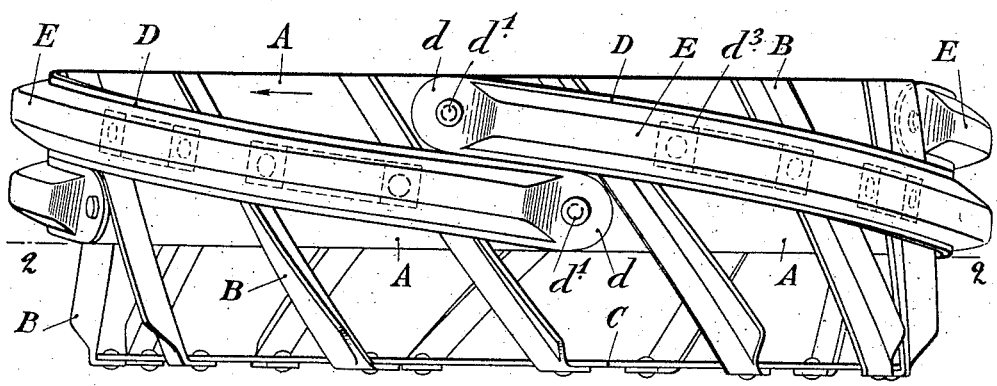
Figure 1 is a plan of an improved tractor wheel constructed according to this invention.

In the example shown in Figs. 1, 2 and 4, the tractor wheel to which the detachable tire is applied, comprises a metal wheel rim A upon which are fixed permanent gripping devices such as angle-bars B projecting to one side.

With advantage, and according to the invention, the projecting ends of the angle-bars B may be connected together by a ring C. This connection has the two-fold advantage of staying the angle-bars together and at the same time preventing all accidents, such as the projections of the angle-bars catching the crew accompanying the tractor or passing close by it.

The improved detachable tire is composed of a series of sectors that may be formed of metal arcs D upon which a rubber tire E is vulcanized. The elements D are bent back at their ends in such a manner as to form lugs $d$ by means of which they are fixed to the outer surface of the wheel rim A with the aid of bolts $d^1$ or keys $d^2$, while the bodies D of the elements form a bridge above the gripping devices B. Below the bodies D of the elements there may be attached stirrups $d^3$ by means of which the element has an intermediate point of support upon the wheel rim A, as shown clearly in Fig. 2.

The detachable elements may be arranged concentric to the wheel (Figs. 5 and 6), or preferably be wound in the form of sections of a helix as shown in Fig. 1.

In any case the ends of adjacent elements overlap each other, the attachments of these adjacent elements being taken between two gripping devices B (Figs. 1 and 5), or on each side of one and the same element (Fig. 6).

Having now particularly described and ascertained the nature of my said invention and in what manner the same is to be performed, I declare that what I claim is:—

1. A detachable tire for tractor wheels provided with gripping devices, characterized by a series of elements consisting preferably of metal arcs on which are vulcanized rubber tires, and which form bridges over the gripping devices, and which are attached to the wheel rim at their ends that are bent over for this purpose, while they receive intermediate points of support on the said wheel rim by means of liners or attached intermediate projections.

2. A detachable tire as claimed in claim 1, wherein the ends of concentric elements are astride of each other, the points of attachment of these elements being taken between two gripping devices.

3. A detachable tire as claimed in claim 1 composed of a series of elements astride of each other at their ends, and wound in the form of a helix over the gripping devices.

Dated this 13th day of May, 1920.

In testimony whereof I have signed this specification.

EUGÈNE SCHNEIDER.

Witnesses:
 ANDRÉ MOSTICKER,
 CLEMENT S. EDWARDS.